(12) United States Patent
Cavallaro

(10) Patent No.: US 6,906,465 B2
(45) Date of Patent: Jun. 14, 2005

(54) END-OF-LIFE PROTECTION FOR COMPACT FLUORESCENT LAMPS

(75) Inventor: Albert Cavallaro, Florida, NY (US)

(73) Assignee: Osram Sylvania Inc., Danvers, MA (US)

(*) Notice: Subject to any disclaimer, the term of this patent is extended or adjusted under 35 U.S.C. 154(b) by 0 days.

(21) Appl. No.: 10/314,743

(22) Filed: Dec. 9, 2002

(65) Prior Publication Data

US 2004/0108817 A1 Jun. 10, 2004

(51) Int. Cl.[7] .............................................. H01J 13/46
(52) U.S. Cl. .................................... 315/32; 315/56
(58) Field of Search .......................... 315/32, 56, 112; 362/362, 376; 361/674

(56) References Cited

U.S. PATENT DOCUMENTS

| | | | | | |
|---|---|---|---|---|---|
| 4,288,239 | A | * | 9/1981 | Hoeh | 65/110 |
| 4,924,368 | A | * | 5/1990 | Northrop et al. | 362/376 |
| 6,033,249 | A | * | 3/2000 | Holzer | 439/356 |
| 6,441,874 | B1 | * | 8/2002 | Saito et al. | 349/70 |
| 6,555,965 | B1 | * | 4/2003 | Oberle | 315/58 |

FOREIGN PATENT DOCUMENTS

WO    WO 01/56060    8/2001

* cited by examiner

Primary Examiner—Thuy Vinh Tran
(74) Attorney, Agent, or Firm—Carlo S. Bessone

(57) ABSTRACT

A self-ballasted fluorescent lamp (10) that comprises a housing (12) formed to contain a ballast. The housing (12) has a top surface (14) with openings (16) leading from the exterior of the housing (12) to the interior. The openings (16) can be in the form of raised bosses having upstanding walls (16a). A restricted portion (18), which can take the form of a flange, is formed with the opening (16) and a safe end-of-life enabling device (20) is positioned in the opening (16) and in contact with the restricted portion (18). The safe end-of-life device (20) is tubular, has low thermal conductivity and in preferred forms of the invention is a glass such as quartz or a ceramic such as aluminum oxide. The ends (22) of a fluorescent lamp (24) penetrate the tubular end-of-life device (20) and extend into the interior of the housing for suitable connection to an enclosed electronic ballast. A retainer (26) is positioned opposite the restricted portion for maintaining the end-of-life device within the opening. The retainer (26) is a typical compact fluorescent cement that is used to fix the lamp to the housing. Alternatively, the retainer can be an adhesive silicone or a threaded washer.

7 Claims, 1 Drawing Sheet

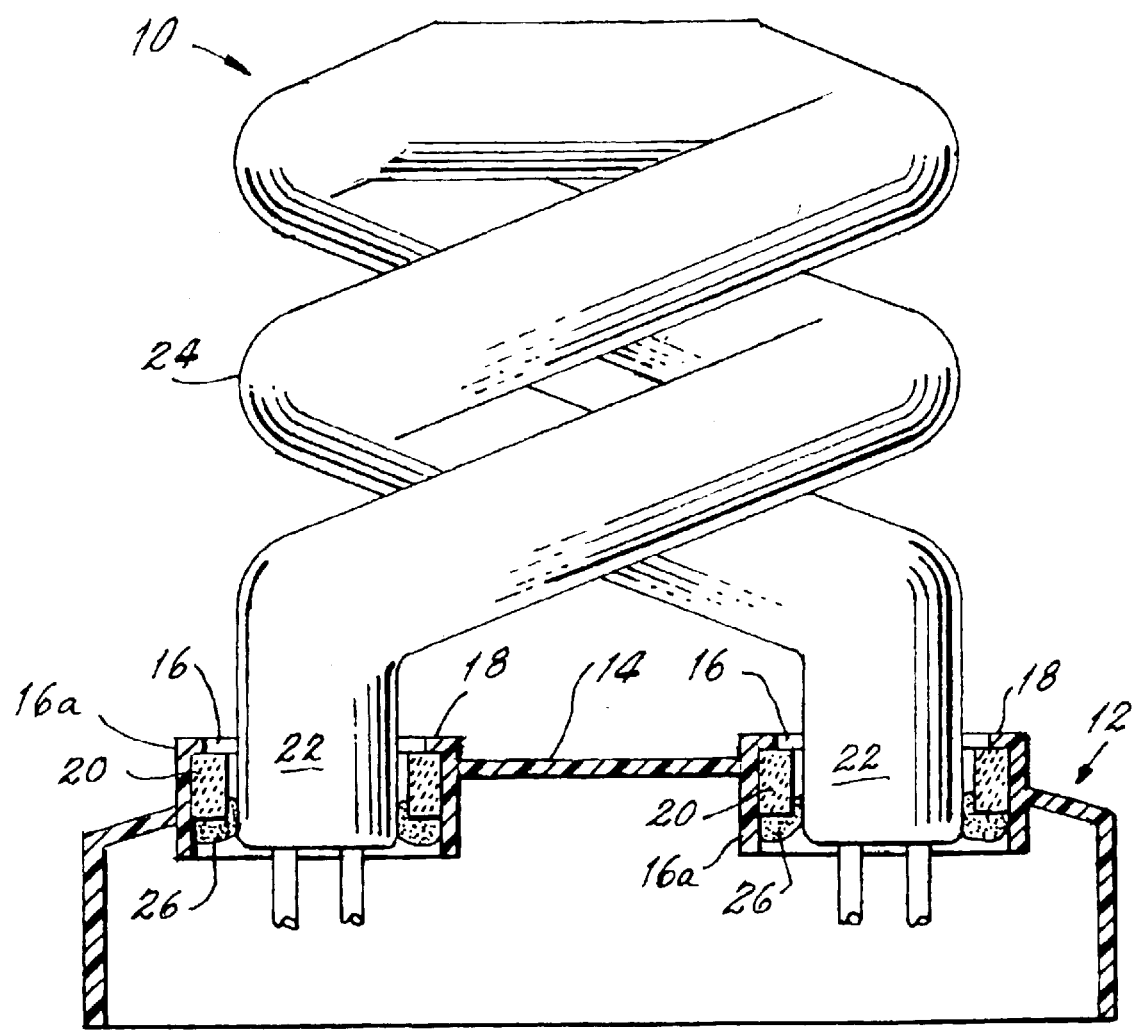

END-OF-LIFE PROTECTION FOR COMPACT FLUORESCENT LAMPS

TECHNICAL FIELD

This invention relates to fluorescent lamps and more particularly to compact fluorescent lamps. Still more particularly, it relates to self-ballasted fluorescent lamps including housings having plastic caps or upper surfaces.

BACKGROUND ART

Self-ballasted compact fluorescent lamps are highly efficient replacements for incandescent lamps. While their initial costs are somewhat higher than the incandescent lamps they are designed to replace, their greater efficacy and longer life make them practical.

Unlike the incandescent lamps they replace, which cease operation immediately upon failure of the filament, compact fluorescent lamps experience end-of-life failure when the filaments of the lamp have depleted their emissive material. Under these conditions the electronic ballast can continue to operate the lamp and dissipate considerable power. This power dissipation can cause localized heating of the glass lamp envelope in the vicinity of the cathode, causing the plastic housing of the ballast to melt.

Increasing the space between the lamp envelope and the wall of the ballast housing is not practical since safety standards for self-ballasted compact fluorescent lamps limit the amount of space between the glass lamp tube and the plastic housing to minimize electrical shock hazards.

DISCLOSURE OF INVENTION

It is, therefore, an object of the invention to obviate the disadvantages of the prior art.

It is another object of the invention to enhance compact fluorescent lamps.

It is yet another object of the invention to improve the safety of compact fluorescent lamps.

Still another object of the invention is the provision of a safe end-of-life enabling device for compact fluorescent lamps.

These objects are accomplished, in one aspect of the invention, by a self-ballasted fluorescent lamp that comprises a housing formed to contain a ballast. The housing has a top surface with an opening leading from the exterior of the housing to the interior. A restricted portion is formed with the opening and a safe end-of-life enabling device is positioned in the opening and in contact with the restricted portion. An end of a fluorescent lamp penetrates the end-of-life device and extends into the interior of the housing for suitable connection to an enclosed electronic ballast. A retainer is positioned opposite the restricted portion for maintaining the end-of-life device within the opening.

The safe end-of-life device has a low thermal conductivity and provides thermal insulation between the glass lamp envelope and the plastic top surface of the housing. Now, at end-of-life, the glass tube will overheat causing a crack to develop in the glass, which will vent the lamp and extinguish it before any damage to the plastic housing can occur.

BRIEF DESCRIPTION OF THE DRAWINGS

The single FIGURE is an elevational view of the invention, partially in section.

BEST MODE FOR CARRYING OUT THE INVENTION

For a better understanding of the present invention, together with other and further objects, advantages and capabilities thereof, reference is made to the following disclosure and appended claims in conjunction with the above-described drawings.

Referring now to the drawings with greater particularity, there is shown in the FIGURE a self-ballasted fluorescent lamp 10 that comprises a housing 12 formed to contain a ballast (not shown). The housing 12 has a top surface 14 with an opening 16 leading from the exterior of the housing 12 to the interior. In the FIGURE, two openings 16 are shown to receive the two ends 22 of a spiral lamp 24. The openings 16 can be in the form of raised bosses having upstanding walls 16a. A restricted portion 18, which can take the form of a flange, is formed with the opening 16 and a safe end-of-life enabling device 20 is positioned in the opening 16 and in contact with the restricted portion 18. The safe end-of-life device 20 is tubular, has low thermal conductivity and in preferred forms of the invention is a glass such as quartz or a ceramic such as aluminum oxide. The ends 22 of the fluorescent lamp 24 penetrate the tubular end-of-life device 20 and extend into the interior of the housing for suitable connection to an enclosed electronic ballast. A retainer 26 is positioned opposite the restricted portion for maintaining the end-of-life device within the opening. As shown the retainer 26 is a typical compact fluorescent cement that is used to fix the lamp to the housing. Alternatively, the retainer can be an adhesive silicone or a threaded washer. It is only necessary that the retainer be compatible with lamp environment and holds the end-of-life device in position.

Thus there is provided a compact fluorescent lamp with improved safety at the end of life that still has adequate electric shock prevention.

While there have been shown and described what are at present considered to be the preferred embodiments of the invention, it will be apparent to those skilled in the art that various changes and modification can be made herein without departing from the scope of the invention as defined by the appended claims.

What is claimed is:

1. A self-ballasted fluorescent lamp comprising:
   a housing formed to contain a ballast;
   a top surface for said housing;
   an opening in said top surface leading from an exterior of said housing to an interior of said housing;
   a restricted portion formed with said opening;
   a safe end-of-life enabling device positioned in said opening and in contact with said restricted portion;
   ends of a fluorescent lamp penetrating said end-of-life enabling device; and
   a retainer positioned opposite said restricted portion for maintaining said end-of-life enabling device within said opening.

2. The self-ballasted fluorescent lamp of claim 1 wherein said safe end-of-life enabling device has low thermal conductivity.

3. The self-ballasted fluorescent lamp of claim 2 wherein said safe end-of-life enabling device is constructed from a glass or ceramic.

4. The self-ballasted fluorescent lamp of claim 3 wherein said glass is quartz.

5. The self-ballasted fluorescent lamp of claim 3 wherein said ceramic is aluminum oxide.

6. The self-ballasted fluorescent lamp of claim 1 wherein said lamp is of a double spiral tube type.

7. The self-ballasted fluorescent lamp of claim 1 wherein said retainer is a fluorescent lamp cement.

* * * * *